Jan. 7, 1947.                H. E. CROWTHER                2,413,692
        OIL SEPARATION METHOD FOR VITAMINIFEROUS
               PROTEIN MATERIAL AND THE LIKE
                    Filed Aug. 24, 1942
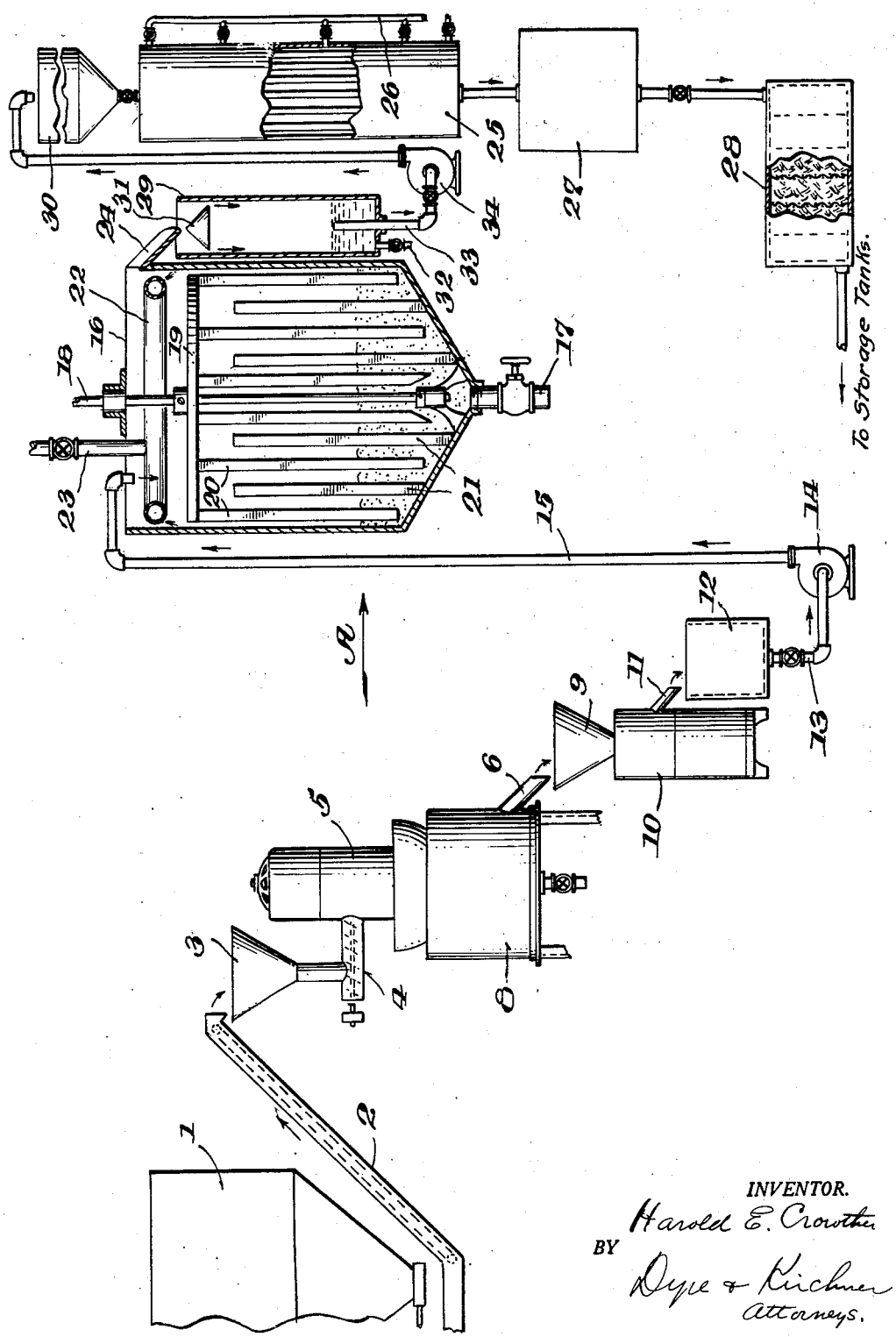
INVENTOR.
Harold E. Crowther
BY
Dyer & Kirchner
      Attorneys.

Patented Jan. 7, 1947

2,413,692

UNITED STATES PATENT OFFICE 2,413,692

OIL SEPARATION METHOD FOR VITAMINIFEROUS PROTEIN MATERIAL AND THE LIKE

Harold E. Crowther, Laurel, Md., assignor to Aquacide Company, Washington, D. C., a corporation of Delaware Application August 24, 1942, Serial No. 455,935

10 Claims. (Cl. 260—412)

1

The present invention provides a method of producing maximum yields of uniformly high quality oil, such as vitaminiferous oil, from oil bearing animal material, more particularly the livers of cod fish and the entire bodies of herring and similar oily fish.

Generally speaking, the principal object of the invention is to improve on the best known methods of extracting oil from such sources as the foregoing examples, and from analogous materials.

More specifically speaking, a principal object of the invention is to provide a method which eliminates the detrimental effects on the oil of the cooking operations or high temperature treatments which characterize the best methods heretofore known, so as to produce an oil product which retains unimpaired the natural physical, chemical and nutritional characteristics and value of the oil present in fresh livers or other source material; which permits more complete and efficient removal of the oil from the source material; which eliminates the production of second and third grade oil by recovering all of the oil content of the raw material as first grade oil; and which permits the production of meal having a lower content of objectionable residual oil.

Another object is to provide a method for controlling the vitamin potency of oil recovered from the source material so that, by properly selected manipulation of the material, its original vitamin content may be recovered almost entirely in the oil product of the process or to a large extent in the solid residue product.

Incidental objects are to provide a method in which the efficiency and interrelation of the several cooperating sequential steps are more or less automatically or otherwise easily and readily controlled without the exercise of any great degree of skill on the part of the operator, so that the method will be practically continuous and automatically operative once it is started.

The accompanying drawing illustrates more or less diagrammatically one suggested type of apparatus which has been found to be a highly satisfactory means for practicing the invention. This apparatus will be referred to more in detail hereinafter.

The oil in such animal tissue as fish livers and the like is principally intra-cellular, and it is therefore necessary, in any method of oil extraction, to rupture the membraneous envelopes of the cells in order to liberate the minute oil globules contained in them. Following this the liberated oil must be separated from the tissue mass by some means. The principal methods heretofore in use involve rupturing of the cell envelopes by cooking, digestion, grinding, autolysis or rotting, followed by skimming, pressing, centrifuging, solvent extraction or other chemical treatment.

In the cooking method, fish livers are heated to a temperature of 158° F. to 212° F., with or without agitation, and are allowed to stand while oil rises to the surface. This oil, known as cook oil, is skimmed off and constitutes the best grade produced by the cooking process. However, even the best cook oil has a darker color, and a more pronounced fishy odor and flavor, than the oil present in the livers prior to cooking. Also, it constitutes much less than the total oil content of the livers. The remainder of the oil content remains entrapped in the mass of protein material in the settling vats and is either discarded or recovered by pressing. This latter oil, amounting to about 25% of the total cooking process yield, if expressed by pressing is known as press oil and usually must be sold as second grade oil because of its inferior quality. The sum of the cook oil and press oil yields is considerably less than the total oil content of the livers, since an appreciable proportion of oil remains in the press residue, which is known as press cake. This oil is not commercially recoverable. It is undesirable in the press cake for a twofold reason: it reduces the yield of oil from the livers, and it makes the press cake less satisfactory for feed and fertilizer use.

The indirect steam cooking or reduced pressure method comprises rupturing the liver cells by means of heat and agitation, under reduced pressure. Separation of the layer of oil which rises to the top of the mass is accomplished by skimming or by decanting. The oil remaining in the protein residue is removed either by pressing or by solvent extraction and is comparable to the press oil of the direct steam method. This method of removing oil under reduced pressure is more costly than the direct steam method, but the skimmed oil is of higher quality. Even in this method temperatures ranging from 140 to 176° F. must be used, and when oil in the presence of protein is heated to such temperatures it takes on a darker color and a stronger odor and flavor.

The method of digestion of the liver tissues by rotting, or by use of chemicals, comprises (as the name implies) dissolving the cell walls as well as the entire tissue mass, so that the oil is liberated and may rise to the surface.

The use of chemicals to dissolve the liver tissue results in comparatively high yields of oil, but the oil produced is not first grade medicinal oil. This process also adversely affects the odor, flavor and palatability of the oil.

The rotting process, which depends on bacterial and enzymatic decomposition is, of course, very slow and inefficient. The oil produced by rotting is of the lowest grade and is much less valuable than oil produced by other methods.

A specific object of the present invention is to provide a method by which the cellular structure of the tissue is effectively ruptured to release its oil content without raising the material to unfavorably high temperatures, without enzymatic or bacterial decomposition, and without the use of strong chemical digestion agents, all of which, as has been seen, cause objectionable changes in the oil.

In this invention, cell wall rupture is accomplished by mechanically comminuting the livers or other material. The means employed may comprise very fine grinding, screening, cutting, crushing or the like. Previous attempts to practice such comminution in a practical oil extracting method have resulted in the formation of stable emulsions. In the present invention, however, such mechanical comminution is accomplished without an objectionable emulsion being formed.

The unemulsified paste resulting from the present comminuting operation is easily manipulated to cause the multiplicity of oil globules liberated from the ruptured cells to combine to form a body of oil distinct from the water and protein, and then to separate this body from the water and protein. The separation is substantially complete, so that practically 100% yields of oil are obtained, and the oil is found to be unchanged from its natural state, i. e., not darkened and devoid of appreciable fishy odor and taste.

Certain features of the process are important, as will now appear from a somewhat detailed description of a preferred form of embodiment involving use of the apparatus illustrated by the accompanying drawing, in which the single figure is a schematic diagram of apparatus by which the method may be practiced.

The initial step in the method comprises treating the material, which for the sake of illustration will be assumed to be fresh cod livers, to produce coagulation, or an effect akin to coagulation, of the protein. This effect may be accomplished by heat, chemical coagulants such as formaldehyde and the like, or by other means. I have found that this step inhibits emulsification in the subsequent grinding or comminuting operation, and this, it will be appreciated, is an important feature of the method.

In explaining the initial step of the method I have used the expression "coagulation or an effect akin to coagulation" to avoid becoming involved in any controversy over the meaning of the term "coagulation" or the exact character of the phenomenon which takes place in the initial step of my method. I deem it sufficient compliance with the patent statutes to explain the actual steps which comprise the method which I have invented, and I shall attempt to state the explanation in such full, clear, concise and exact terms as to enable any person skilled in the art to practice the invention.

The purpose of the initial step is to render the protein constituent of the source material substantially incapable of going into solution in the water or oil with which it is associated in practice of the method, and substantially to reduce the ability of the protein to promote an emulsion of the water and oil. Hence, it seems appropriate to apply the term "coagulate" and its derivatives to the initial step of the present method, provided the foregoing explanation of possible differences between the present coagulation and some special kinds of coagulation be kept in mind.

When coagulation is effected, either by chemicals, by heat, or other means, the tissue cells no longer remain flexible and soft, but become comparatively firm and rigid and are not readily forced into an emulsion-stabilizing suspension with water and oil. Also, a large percentage of the once soluble protein becomes insoluble. Therefore, when the coagulated tissue is subjected to the fine grinding or other comminuting step the protein, instead of going into solution or breaking down into the solution-like stage with the tissue water, takes on a granular-like formation. That is, instead of protein going into solution or suspension in the water it forms minute particles which are not readily soluble in the tissue water. Therefore, the oil which was once trapped in the liver tissue is released and surrounds the tissue particles in an unemulsified state of comparatively large globules, films or layers.

If coagulation be accomplished by heating the livers, care should be taken to avoid prolonged use of high temperatures, i. e., cooking temperatures, that would result in discoloration or other physical or chemical change in the oil. A safe rule to follow is to avoid such application of heat as would break down the cell walls and liberate the oil. In other words, heating should cease when the livers are well coagulated and before they become cooked, as that term is applied to the heating in the cooking methods of extracting oil.

In some types of fine grinding which I may practice sufficient heat is developed in the grinding operation to produce some coagulation. In fact, it is possible to use a grinding means that will produce all the required coagulating effect. Whether or not coagulation will be effected entirely in the grinding operation, or entirely by chemical means, or partly by both, depends on conditions. For example, if the material must be held a relatively long time before processing, then it is economical to use chemical agents for the common purposes of preserving and coagulating. If the livers are fresh at the time of processing, it may be found economical to employ a grinding means which develops substantially all the desired heat. If it be found that a particular grinding means develops insufficient heat to produce all the required coagulating effect, coagulation may be promoted by independent means, such as by addition of chemical.

I prefer to coagulate by application of chemical agents to the livers, for example by subjecting them to the action of formaldehyde. Thus, one hundred pounds of raw, fresh livers may be mixed into a solution of three pounds of formalin and twenty pounds of water. Or the same weight of raw, fresh livers may be uniformly treated with one pound of paraformaldehyde, which is a dry powder and leaves the treated livers in the mixing vat substantially devoid of free water.

In either case, referring now to the drawing, a supply of livers is kept in the receiving and coagulating tank 1, whence portions are taken from time to time for comminuting and further processing. If the treated livers are in the solution first above suggested in the tank 1, they are drained of excess solution when they are removed, and this draining is satisfactorily accomplished by removing them by means of the perforated conveyor 2. In any event the livers are fed into a hopper 3 supplying a screw conveyor 4 which feeds a grinding machine 5, here shown as a Rietz disintegrator, where they are reduced to a coarse paste which issues from the outlet 6. The Rietz disintegrator is a well known machine and hence requires no special description except to state that it conveniently includes magnet means at the levels 4 and 6 for removing metallic objects, such as fishhooks, from the livers, and a sump 8 in its lower portion, below the outlet 6, for collecting other foreign solids, such as wood and pebbles.

The coarse liver paste is discharged from the disintegrator into the hopper 9 of a colloid mill 10, preferably of the high speed type made by Premier Mill Corporation, of Geneva, New York. This mill, the essential elements of which are carborundum faced rotor and stator members set for use in the present method at a clearance of approximately 0.003 inch, reduces the coarse paste to a fine, creamy texture in which substantially all the cells are ruptured and all the oil globules which were contained in the individual cells are released.

The colloid mill product is a homogeneous paste, oily in character because the oil globules have been liberated from the membraneous envelopes in which they were originally contained, but is not an emulsion. Although the oil is uniformly distributed throughout the paste, it is quite clear, which is indicative of a very low moisture content, and it is not finely divided into the minutely dispersed globules which are characteristic of oil and water emulsions.

This fine paste is discharged through an outlet 11 into a receiving tank 12 whose function is to provide a continuous supply source for the oil separating means that will presently be described. Of course the paste product of the mill 10 might be introduced directly into the oil separating means, but interposition of the tank 12 permits a greater degree of fluctuation in the relative operations of the comminuting and separating means and usefully increases the flexibility of the process.

The paste in the tank 12 is drawn off from time to time through a valved outlet 13 by some such means as a pump 14 in a pipe 15 which discharges into an oil separating means, here shown as a flotation tank 16. It is in this tank that separation of the oil from the water and solids takes place, and certain special features of the tank and technique in its use are employed to facilitate the separation.

The tank is best made cylindrical, tapering to a conical bottom having a central valved outlet 17. Axially of the tank is positioned a rotable shaft 18 having an arm 19, or a plurality of such arms, radiating from its upper portion and supporting depending stirring blades 20 which pass, when the shaft is rotated, through the spaces between fixed blades 21 upstanding from the tank bottom. The blades 21 are set in alignment diametrically across the tank, or in a plurality of radial lines. A circular header pipe 22 is positioned in the tank above the arms 19 and has a multiplicity of small perforations juxtaposed to the inner wall of the tank so that water fed to the header by a valved supply pipe 23 may be sprayed outwardly and downwardly against the tank wall to flow by gravity down such wall. An outlet spillway 24 is provided in the tank above the header 22 and discharges into an oil receiving tank 29.

In the use of the apparatus thus far described, fine paste from the receiving tank 12 is introduced into flotation tank 16 up to about the level indicated by the arrow A and the shaft 18 is rotated at about five to fifteen R. P. M. while water is slowly introduced from the header 22. Such gentle stirring of the paste has the effect of bringing the minute discrete globules of oil into contact with each other so that they combine to form bodies of sufficient size to rise in the water and form a layer which floats on the surface of the tank contents. The solid tissue material, being heavier than water, particularly when freed of the buoyancy of adherent oil film or globules, sinks in the tank. The result of this gentle stirring and addition of water is that by the time the level of the tank contents has risen to the spillway 24, the uppermost layer is oil having a moisture content of less than one per cent. Below this is a relatively shallow layer of quite clear water, and underlying this water layer is a mass of protein material dispersed in water and progressively denser toward the tank bottom.

After the oil level reaches or almost reaches the spillway 24, rotation of the shaft 18 may be stopped while discharge of water from the header 22 is continued until all the oil of the topmost layer has passed out of the tank through the spillway. Thereupon, the introduction of water is stopped, and the valve in outlet 17 is opened to drain the sludge and water. This completes a cycle of operation of the flotation tank and leaves the tank in readiness for a repetition of the cycle.

The foregoing constitutes one mode of using the apparatus and one species of the generic method proposed by the present invention. It will be recalled that one object of the invention was stated to be the controlling of the relative vitamin potencies of the oil and solid residue products. Practice of the method which has just been explained results in oil of lower vitamin potency and in residue of higher vitamin potency than are produced by slightly modifying the method step practiced in the flotation tank 16 in the manner which will now be described.

This modification consists in operating the stirring mechanism of the flotation tank for a longer period of time, and/or at a higher rate of speed, than is necessary merely to effect separation of the oil from the water and the protein. In other words, the paste product of the colloid mill may be beaten or whipped or vigorously stirred in the flotation tank before any water is added, so as to cause each minute oil globule to rub or move in intimate contact with a multiplicity of solid particles many times before this action is stopped and the oil globules are allowed to coalesce and stratify. I have found that such action materially increases the vitamin potency of the oil product, and I believe this effect may be explained by the hypothesis that much of the vitamin content of the source material is originally contained in the protein or other solid matter of the material, rather than in the oil fraction as has been heretofore supposed. I have made in my experiments a number of observations which support this hypothesis, but whatever may be the true explanation, it is a fact that increased or prolonged stirring or agitation of the paste increases the oil to residue ratio in respect of vitamin potency. Hence, control of the agitating step in the flotation tank provides a convenient mode of regulating the distribution of the available vitamins in the oil and residue products. Thus, if a relatively higher potency medicinal oil is to be produced, the paste in the flotation tank will be more thoroughly agitated than if a protein product of higher vitamin potency is desired.

Certain aspects of the flotation tank construction and operation are worthy of mention. For example, it is advantageous to provide sight glasses in the tank wall to enable the operator to observe the progress of the separation and stratification and control the speed of the stirring and rate of water admission accordingly. I have found that if water is added too rapidly before separation of the oil from the protein has progressed sufficiently to form a substantial layer above the protein, clumps of the oil-protein mixture will tend to float on the surface of the water. I have also found that too violent stirring, particularly during the initial addition of the water, tends to emulsify the mass. This is especially likely to happen if any alkaline treating substance be present in the paste. It is impossible to state accurately in figures the permissible maximum speed for rotation of the stirrer shaft and the permissible maximum rate of water admission, since these factors will vary considerably with the size, dimensions and proportions of the apparatus, the physical and chemical condition of the material, the relative quantities used, etc., but it is a very simple matter in practice to begin operations with low stirring speeds and low rates of water admission and increase them gradually and carefully until it is evident from observation that maximum efficiency and speed of separation have been attained.

Stirring or equivalent manipulation of the fine paste product from the colloid mill is important because by such means the minute, discrete and uniformly dispersed oil yields from the individual cells are brought into contact with each other to combine into larger bodies having enough buoyancy to rise rapidly to the surface of the water. This combination takes place apparently because the oil particles have greater affinity for each other than they have for the coagulated protein. The combining is promoted by the tendency of the finely ground coagulated protein to absorb water. Such absorption of water forces from the protein such oil as may be adhering to it. It is possible also that the finely ground condition of the protein increases its capillary attraction for water. At any rate, whatever may be the explanation of the phenomena which take place, gentle movement of the finely ground paste in the presence of water has the effect of causing the oil to collect on the surface of the mass and the protein to settle in water at the bottom.

The oil discharged through the spillway 24 is of the highest quality. Its water content is at the unexpected low level of not more than one per cent, it is light in color and exceptionally free from fishy odor and taste. Except for its slight moisture content it is practically identical in physical and chemical characteristics with the oil in the original fresh material.

It is to be understood that use of the tank 16 with its stirring means is not essential to practice of the method. I employ the tank as a convenient instrumentality for causing the oil yields of the individual cells to combine with each other and separate from the protein material. Other kinds of manipulation of the fine paste product of the colloid mill may be employed to obtain these results. For example, to eliminate stirring the paste may be passed over a series of baffles or other means to cause the oil globules to tumble into contact with each other. To eliminate all or part of the water addition the paste may be stirred or similarly treated and then centrifuged, pressed, filtered or similarly manipulated to separate the oil from the protein fraction.

It is desirable to dehydrate the oil which issues from the spillway 24, and for this purpose any of the conventional methods of dehydrating perishable medicinal oils may be used. I prefer to use a vacuum dehydrating stripping tower of the type shown at 25, the details of which form no part of the present invention and which therefore need not be particularly described beyond stating that water vapor distilled from the oil is drawn off through a manifold pipe 26 and dehydrated oil is collected in a receiver 27 from which it may be pumped through a conventional filter press 28 for removal of any minute particles of solid matter that may have been left entrained or suspended in the oil.

Other dehydrating means or methods may of course be substituted for the stripping tower. For example, I may add any of the water-absorbent chemicals that are well known and used for this and analogous purposes.

In order to provide for continuous operation of the stripping tower or other dehydrating means, it is convenient to provide a receiver tank 29 for the spillway 24 and a supply tank 30 for the dehydrating means. Wet oil entering the tank 29 flows over a conical deflector 31 and then down the sides of the tank with a minimum of turbulence, so that some of its water content settles in the bottom of the tank whence it is removed from time to time through the drain valve 32. Oil is withdrawn through the elevated outlet pipe 33 by a pump 34 and discharged into the supply tank 30, and the system may be operated to keep this supply tank reasonably filled with oil so as to permit the dehydrating means to operate constantly and at a maximum efficiency. To this end, automatic controls of conventional type may be employed to operate the pump 34 in response to the level of oil in the tank 30. In such case the tank 29 will have sufficient capacity to keep the tank 30 well supplied, and of course the capacity of the tank 16 will be such that its periodic outputs will maintain the required supply of oil in tank 29. Likewise the tank 12 will be properly sized in relation to the tank 16. It will be understood that the principal functions of the several tanks 12, 16, 29 and 30 are to permit the system to be operated at such pace as will provide a continuous supply of oil to the stripping tower or other dehydrating means or final processing instrumentality for the oil, so that such final instrumentality may be kept in continuous operation and each anterior processing means will always have a supply of material awaiting treatment. In this way each of the several treating instrumentalities can be fed material and be put into operation whenever its product is required by a subsequent instrumentality.

The protein and water remaining in the flotation tank 16 after the oil has been removed may be treated to convert the protein into liver meal. To accomplish this the water is removed from the protein material by some method of dehydration such as evaporation, flash drying, etc.

Inasmuch as my flotation process removes practically all of the oil from the protein, the meal resulting from the drying of the protein contains a very low percentage of oil. The value of a meal depends to a large extent on its oil content. As the percentage of the oil increases the value of the meal decreases. Therefore, the efficiency of this process in removing the oil from the protein is of considerable value not only in the increased high quality oil yield, which is the primary object of the invention, but also in the superior quality of the meal product.

Another specific embodiment of the method is of particular utility in the case of source material which is high in vitamin potency and low in oil content. Swordfish livers are an example of such a material. In applying my method to such material, neutral oil is added to the paste produced by the colloid mill and the resulting mass is handled in the flotation tank and thereafter throughout the method in the manner which has been described, exactly as if the added oil were originally contained in the material. Neutral oil is oil from any suitable source which is entirely or relatively devoid of vitamin potency. It may be fish oil of relatively low vitamin potency, or a vegetable oil such as corn oil. It merely supplies the oil deficiency of the material and combines with the natural oil thereof to serve as a vitamin vehicle. This embodiment of the method is regarded as a method of recovering oil from oil-containing material within the meaning and scope of the appended claims, inasmuch as it extracts oil from the material, although such oil is low in volume and is diluted with foreign oil so that the very high natural vitamin potency of the natural oil is correspondingly distributed throughout all the mixed oil product.

Various modifications of the apparatus and of the several embodiments of the method herein disclosed will suggest themselves to those skilled in the art, and all such modifications, to the extent that they embody the principles of the invention as defined by the appended claims are deemed to be within the scope and purview thereof.

I claim:

1. The method of recovering oil from oil-containing coagulable animal tissue material which comprises first coagulating the protein of the material, then draining from the material the free liquid resulting from coagulation, then grinding the coagulated protein to a fineness that ruptures substantially all the cells and would result in an emulsion if the protein were not coagulated or if the free liquid resulting from coagulation were present in appreciable amounts, whereby the oil contents of the individual cells are released into the ground mass, then stirring the ground mass with added water to bring separated small globules of oil into combining contact with each other, thereafter holding the stirred mass until substantially all the oil thereof has stratified above the water thereof, and then removing said oil.

2. The method of producing oil from oil-containing coagulable animal tissue material which comprises first coagulating the material, then draining free water therefrom, then comminuting said material sufficiently to rupture substantially all the cells and liberate the oil from the individual cells into the comminuted mass without producing an emulsion, then adding water to said mass so as to cause the oil yields from the cells to float as a body of oil on the comminuted mass, and thereafter removing said floating body of oil.

3. The method of recovering separated oil and solid residue from oil-containing coagulable animal tissue material and of controlling the relative vitamin potencies of said oil and residue which comprises first coagulating the material, then draining free water therefrom, then releasing the oil from the cells of the material by comminuting it to a fineness that ruptures substantially all the cells and would result in an emulsion if the material were not coagulated or if free water were present in appreciable amounts, then bringing the released oil globules therein into intimate contact with the solid particles of the mass until the vitamin content of the original material is divided between the oil and solid fractions in a predetermined desired proportion, then adding water to cause the oil globules to combine with each other and float on the water, and then separating the oil and the solid matter from the comminuted mass and from each other.

4. The method of recovering oil from oil-containing coagulable animal tissue material which comprises first coagulating the material, then draining free water therefrom, then releasing the oil from the cells of the material by subjecting it to a fine grinding operation that ruptures substantially all the cells and would result in an emulsion if the material were not coagulated or if free water were present in appreciable amounts, then stirring the mixture and adding water to bring the oil yields of the cells into combining contact with each other to form oil globules capable of being mechanically separated from the other constituents of the mixture, and then mechanically separating the oil from said other constituents.

5. The method of recovering oil from oil-containing coagulable animal tissue material which comprises first coagulating the material, then draining free water therefrom, then releasing the oil from the cells of the material by subjecting the material to a grinding action that ruptures substantially all the cells and would result in an emulsion if the material were not coagulated or if free water were present in appreciable amounts, then stirring the mixture and adding water to bring the oil yields of the cells into combining contact with each other to form oil globules capable of being mechanically separated from the other constituents of the mixture, and then mechanically separating the oil from said other constituents.

6. The method of recovering oil from oil-containing coagulable animal tissue material which comprises first coagulating the material, then draining free water therefrom, then grinding the drained material to a relatively coarse particle size in which most of the cells are unruptured, then releasing the oil from the cells by subjecting the material to a grinding action that ruptures substantially all the cells and would result in an emulsion if the material were not coagulated or if free water were present in appreciable amounts, then stirring the mixture and adding water to bring the oil yields of the cells into combining contact with each other to form oil globules capable of being mechanically separated from the other constituents of the mixture, and then mechanically separating the oil from said other constituents.

7. The method of recovering oil from oil-containing coagulable animal tissue material which comprises first coagulating the material by subjecting it to a water solution of a chemical coagulant, then draining the solution and substantially all free liquid therefrom, then releasing the oil from the cells of the material by subjecting it to a fine grinding operation that ruptures substantially all the cells and would result in an emulsion if the material were not coagulated or if free water were present in appreciable amounts, then stirring the mixture and adding water to bring the oil yields of the cells into combining contact with each other to form oil globules capable of being mechanically separated from the other constituents of the mixture, and then mechanically separating the oil from said other constituents.

8. The method of recovering oil from oil-containing coagulable animal tissue material which comprises coagulating and grinding, in a substantial absence of free water, a quantity of said material to a fineness that ruptures substantially all the cells of the material and would result in an emulsion if the material were not coagulated or if free water were present in appreciable amounts, thereby releasing the oil from the cells, then adding water to the finely ground product and stirring the mixture to bring the oil yields of the cells into combining contact with each other to form oil globules capable of being mechanically separated from the other constituents of the mixture, and then mechanically separating the oil from said other constituents.

9. The method of recovering separated oil and solid residue from oil-containing coagulable animal tissue material and of controlling the relative vitamin potencies of said oil and residue which comprises first coagulating the material, then draining free water therefrom, then releasing the oil from the cells of the material by comminuting it to a fineness that ruptures substantially all the cells and would result in an emulsion if the material were not coagulated or if free water were present in appreciable amounts, then stirring the mixture and adding water to bring the released oil globules into intimate contact with the solid particles of the mass until the vitamin content of the original material is divided between the oil and solid fractions in a predetermined desired proportion, then holding the comminuted mass until the oil globules combine and float on the water as a stratified body of oil, then decanting said body of oil, and then removing the solid residue.

10. The method of producing oil from fish liver material which comprises first coagulating the material, then draining free water therefrom, then comminuting said material sufficiently to rupture substantially all the cells and liberate the oil from the individual cells into the comminuted mass without producing an emulsion, then adding water to said mass so as to cause the oil yields from the cells to float as a body of oil on the comminuted mass, and thereafter removing said floating body of oil.

HAROLD E. CROWTHER.